United States Patent [19]
Lawrence et al.

[11] Patent Number: 5,813,242
[45] Date of Patent: Sep. 29, 1998

[54] DEFROST CONTROL METHOD AND APPARATUS

[75] Inventors: John M.W. Lawrence, Newbury; Brian C. Parker, Ryton, both of United Kingdom

[73] Assignee: JTL Systems Limited, Berkshire, England

[21] Appl. No.: 886,434

[22] Filed: Jul. 2, 1997

[30] Foreign Application Priority Data

Jul. 5, 1996 [GB] United Kingdom ............ 9614157

[51] Int. Cl.⁶ ...................................... F25B 47/02
[52] U.S. Cl. ........................... 62/156; 62/211; 62/223; 62/225
[58] Field of Search .................. 62/151, 155, 156, 62/140, 128, 225, 224, 223, 203, 204, 211

[56] References Cited

U.S. PATENT DOCUMENTS

| | | | |
|---|---|---|---|
| 2,432,859 | 12/1947 | Carter | 62/225 |
| 5,046,324 | 9/1991 | Otoh et al. | 62/156 X |
| 5,551,248 | 9/1996 | Derosier | 62/155 |

FOREIGN PATENT DOCUMENTS

| | | |
|---|---|---|
| 0494785A1 | 7/1992 | European Pat. Off. . |
| 2157447 | 10/1985 | United Kingdom . |
| 2203865 | 10/1988 | United Kingdom . |
| 2302725 | 1/1997 | United Kingdom . |
| 2308192 | 6/1997 | United Kingdom . |

*Primary Examiner*—Harry B. Tanner
*Attorney, Agent, or Firm*—Andrus, Sceales, Starke & Sawall

[57] ABSTRACT

A defrost control system comprises a superheat detector for detecting the degree of superheat of refrigerant leaving an evaporator or the presence of liquid in the refrigerant, a temperature sensor for sensing the temperature of a thermal load cooled by the evaporator and an electrically operable expansion valve for controlling the flow of refrigerant through the evaporator, each connected to a control circuit. In normal operation, the control circuit controls the flow of refrigerant to keep the temperature of the thermal load constant. However, if the superheat detector detects that the superheat is too low, the control circuit overrides the normal operation and reduces the flow of refrigerant. If the control circuit determines that the time spent in override condition over a period exceeds a maximum level, defrosting of the evaporator is triggered.

14 Claims, 8 Drawing Sheets

DEFROST CONTROL METHOD AND APPARATUS

FIELD OF THE INVENTION

The present invention relates to a method and apparatus for controlling defrosting of an evaporator in a heat transfer system, particularly but not exclusively in a refrigeration system in which there is a forced airflow over the evaporator.

BACKGROUND OF THE INVENTION

FIG. 1 shows in cross-section a refrigerated display cabinet 2, which is one example of such a refrigeration system. The cabinet 2 has a number of shelves for displaying chilled food or drinks. The cabinet 2 is open at the front (to the left in FIG. 1) to allow shoppers easy access to the contents of the shelves 4. The contents are cooled by air blown by a fan 6 over an evaporator 8 of the refrigeration system, which cools the air. As shown by the arrows in FIG. 1, the air leaves the evaporator 8, is forced up a duct 10 and escapes through small vents 12 so that some of the air flows over the contents of the shelves 4.

Most of the air passes through an end aperture 14 at the top of the cabinet 2 and falls as a curtain of cold air down the open front of the cabinet 2 and into an inlet 16, to be recirculated over the evaporator 8. The air curtain hinders the warm ambient air from entering the cabinet.

However, some of the ambient air is drawn into the inlet 16. The ambient air includes water vapour which condenses and freezes on the evaporator 8 to form frost. The frost impedes the passage of air over the evaporator 8 and reduces the efficiency of heat exchange between the evaporator 8 and the air. If the frost is allowed to build up, the rate of airflow will be reduced sufficiently to prevent the air curtain from forming and the internal temperature of the cabinet will rise. Furthermore, the efficiency of the refrigeration system will be reduced, leading to higher running costs.

For these reasons, it is necessary to defrost the evaporator 8 in such refrigeration systems every few hours. There are different conventional methods by which this can be done. In the "air over" or "off cycle" method, the refrigeration is stopped and the evaporator 8 is defrosted by air at ambient temperature passing over it. In the electric defrost method, electric heating elements are provided around the evaporator 8. During a defrost cycle, the flow of refrigerant through the evaporator 8 is stopped and the electric heating elements are switched on, thereby melting the frost. The fan 6 may be switched off.

In the gas defrost method, gas is passed through the evaporator so as to warm it and melt the frost. The gas may be directed from the outlet of the compressor of the refrigeration system through the evaporator, so that the evaporator 8 acts temporarily as a condenser and the refrigeration cycle acts in reverse to release heat from the evaporator 8. This is known as the "hot gas" method.

Alternatively, the gas may be taken from the top of the receiver of the refrigeration system, in which the refrigerant is stored before passing through the expansion valve. This is known as the "cool gas" method, since the refrigerant has passed through the condenser and is cool.

During a defrost, the air temperature inside the cabinet 2 rises above the normal storage temperature, and the contents are subject to "temperature shock". The effect of this temperature shock is to reduce the shelf life of perishable goods. Moreover, the defrost cycle consumes a significant amount of energy, typically around 10% of the total energy used in refrigeration.

Therefore defrost cycles should not occur too frequently, but neither should they occur so infrequently that the refrigeration efficiency of the cabinet 2 is impaired.

In one conventional method of defrost control, a defrost is initiated periodically at intervals sufficiently short to prevent the evaporator 8 from frosting up completely and thereby blocking the flow of air, even at the maximum absolute humidity for which the cabinet 2 is designed. This interval is typically between 6 and 8 hours. However, when the absolute humidity is less than its maximum, defrosts occur more frequently than required.

It is therefore desirable to initiate a defrost "on demand", that is to say only when it is needed.

Methods of initiating defrost on demand have been proposed, in which the depth of ice on the evaporator is detected by frost sensors. These add to the cost of the refrigeration system.

The document EP-A-0 494 785 describes a defrost control system using a temperature sensor within an evaporator unit to determine when defrost is required.

The document U.S. Pat. No. 5,319,943 describes a defrost control system for a heat pump, using temperature sensors which measure the temperature of the ambient air and of an outdoor coil which is operable as an evaporator.

The document U.S. Pat. No. 5,493,867 describes a defrost control system which uses "fuzzy logic" to vary the interval between defrosts according to the time taken to complete a defrost operation. Such methods, while allowing the defrost interval to vary according to the environment of the heat transfer system, are not able directly to determine when the efficiency of the evaporator has become unacceptable and a defrost is therefore required.

SUMMARY OF THE INVENTION

According to one aspect of the present invention, there is provided a method of controlling defrosting of an evaporator in a heat transfer system, in which the superheat of refrigerant at the evaporator outlet is used to determine when defrosting is required. The superheat of the refrigerant provides a more direct measurement of the efficiency of the evaporator than the prior art methods, since if the superheat falls below a minimum level, this indicates that insufficient heat is absorbed by the evaporator, which may be a result of frost on the evaporator.

The superheat itself may be measured, or a liquid sensor may be used to determine whether liquid refrigerant is present at the outlet, indicating that the refrigerant has no superheat. Use of a liquid sensor is preferred, since the refrigerant leaving the evaporator should have as low a superheat as possible, for efficient use of the evaporator, but liquid should be prevented from entering the compressor. The liquid sensor is suitable for detecting a point at which both criteria are satisfied.

Preferably an expansion valve through which refrigerant flows into the evaporator is controlled according to a sensed temperature of the thermal load of the heat transfer system. The control is overridden and the flow through the expansion valve is reduced when the degree of superheat of refrigerant at the evaporator outlet falls below a predetermined level or a predetermined proportion of liquid is detected at the outlet. Defrost of the evaporator is initiated when the overrides exceed a predetermined level.

Hence, defrost is initiated when the evaporator is no longer able continuously to maintain the temperature of the thermal load within a desired range without causing the superheat of the refrigerant at the outlet to fall below a minimum level or liquid to appear at the outlet. This situation is a direct result of the reduction in efficiency of the evaporator due to frost. Hence, defrost is only initiated when it is required to overcome this reduction in efficiency.

BRIEF DESCRIPTION OF THE DRAWINGS

Specific embodiments of the present invention will now be described with reference to the accompanying drawings in which.

DETAILED DESCRIPTION OF THE PREFERRED EMBODIMENTS

Figure 1:
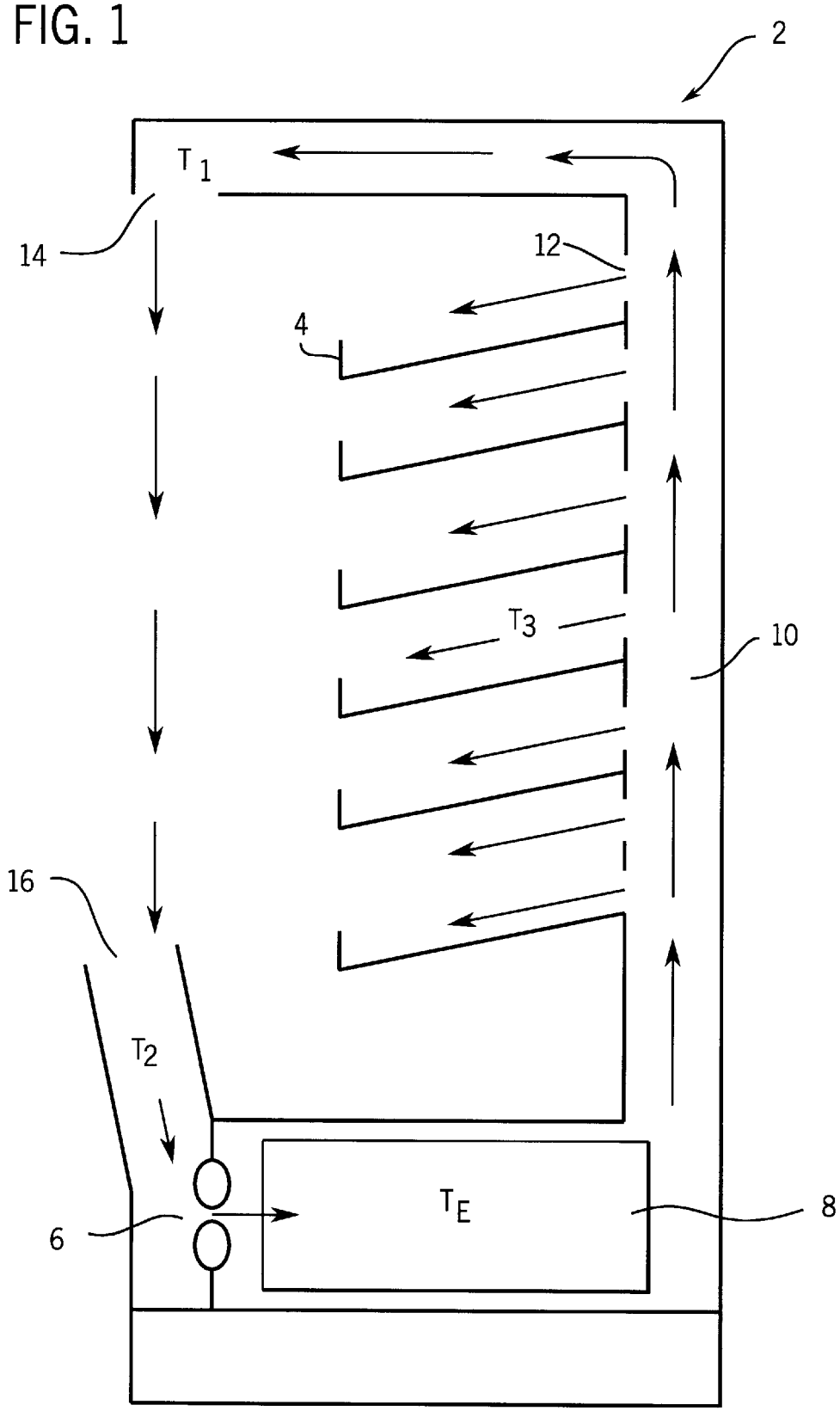
FIG. 1 is a cross-sectional diagram of a refrigerated display cabinet.
Figure 2:
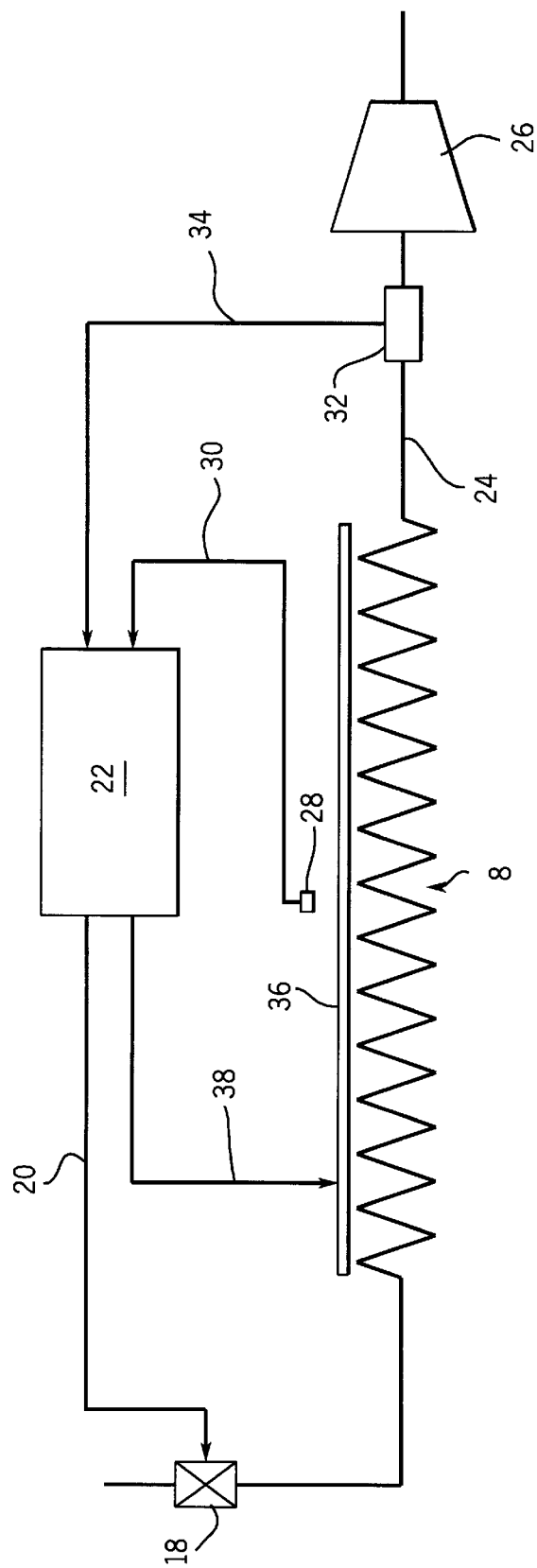
FIG. 2 is a schematic diagram of control apparatus of a heat transfer system in an embodiment of the present invention.

A specific embodiment of the present invention will now be described with reference to FIGS. 1 to 4. FIG. 2 shows part of the refrigeration system, comprising an expansion valve 18 through which refrigerant at high pressure from the condenser is admitted into the evaporator 8 at low pressure. The expansion valve 18 is controlled by an electrical signal on a line 20 connected to a control circuit 22. The control circuit 22 controls the time periods for which the expansion valve 18 is opened and closed within a continuously repeated cycle. The cycle is typically one of six or eight seconds duration, the valve being pulsed open once in each cycle for a period determined by the required flow rate. Other types of electrically controlled valve may be used, such as a stepper motor valve.

As the refrigerant passes at low pressure through the evaporator 8, it evaporates and absorbs heat from the air surrounding the evaporator 8 as the latent heat of evaporation. The evaporated refrigerant passes through an outlet 24 of the evaporator 8 and is returned through a suction pipe to a compressor 26 which compresses the refrigerant to high pressure and outputs it to the condenser (not shown), where the refrigerant condenses and releases the latent heat.

A temperature sensor 28 senses the temperature outside the evaporator 8. For example, as shown in FIG. 1, the temperature sensor 28 may be positioned to sense the external temperature $T_E$ around the evaporator 8, the "air off" temperature $T_1$ of air leaving the duct 10, the "air on" temperature $T_2$ of air entering the inlet 16 or the temperature $T_3$ of the storage area of the cabinet. The temperature sensor 28 generates an electrical signal representing the sensed temperature on the line 30, which is input to the control circuit 22.

In normal operation, the control circuit 22 sets the duty ratio of the signal on the line 20 according to the relationship between the temperature sensed by the temperature sensor 28 and a desired temperature range programmed in the control circuit 22. If the sensed temperature is below the desired range, the expansion valve 18 will be open for a shorter period, so as to reduce the flow of refrigerant to the evaporator 8, whereas when the sensed temperature is above the desired range, the expansion valve 18 is open for a longer period so as to increase the flow of refrigerant through the evaporator 8.

However, if the flow of refrigerant through the evaporator 8 is increased to such an extent that not all of the liquid refrigerant evaporates in evaporator 8, liquid refrigerant will be present at the outlet 24 of the evaporator 8 and may subsequently enter and damage the compressor 26.

In order to prevent liquid refrigerant from entering the compressor 26, a superheat sensor 32 is provided at the outlet 24 of the evaporator 8. The superheat sensor detects the level of superheat of the refrigerant, which is the temperature difference by which the temperature of the refrigerant exceeds the boiling point of the refrigerant at the outlet pressure. If the superheat is zero, the refrigerant is at boiling point and there will be liquid refrigerant present at the outlet 24.

The superheat sensor 32 outputs an electrical signal on a line 34 to the control circuit 22, whereby the control circuit 22 detects whether the degree of superheat has fallen below a predetermined safe level. In that case, the control circuit 22 enters an "override" condition in which it controls the expansion valve 18 to reduce the flow of refrigerant through the evaporator 8 until the detected degree of superheat rises above a predetermined level, which may be the same as or different from the minimum level.

Suitable sensors 32 for detecting superheat are described in more detail in UK patent publication number 2,302,725, which is incorporated herein by reference. One example of such a device will now be described with reference to FIG. 3. The device comprises a body 60 having a portion 61 which is threaded so as to permit the device to be mounted in a fluid-sealing manner in the wall 25' of the suction pipe 25 at the outlet 24 of the evaporator 8. The body 60 has an internal chamber 63 which is in open communication with the fluid flowing through the pipe 25 at the end having the threaded portion 61. A movable member in the form of a flexible diaphragm 62 is mounted within the chamber 63 on support elements 64 and 66.

The upperside of the diaphragm 62 in the drawing is in open communication with the fluid within the chamber 63, via respective apertures 65, 67 in the support elements 64, 66. This upperside of the diaphragm is thereby subject to the vapour pressure of the fluid at the outlet 24 of the evaporator. The lower side of the diaphragm is isolated from the vapour pressure of the refrigerant fluid within the chamber 63, and is coupled instead to a container in the form of a phial 68 containing a quantity of liquid, as indicated by the horizontal shading in the drawing. The coupling forms a closed sub-chamber 69 containing a saturated vapour of the liquid within the phial. In this embodiment, the phial is fixed in its location with respect to the body of the sensor device and is disposed substantially externally of the body. Thus, the phial is surrounded by the refrigerant fluid flow, its liquid content acquires the temperature of that fluid, and a vapour pressure corresponding to that temperature is exerted on the lower side of the diaphragm by the vapour within the sub-chamber 69.

A difference in the respective vapour pressures exerted on the opposite, upper and lower surfaces of the diaphragm 62 determines a vertical displacement of the diaphragm which is related to the amount of superheat. A detector for the diaphragm displacement is housed in the support element 66. The detector comprises an elongate linearly-movable member 70 coupled to the diaphragm, and a position sensor 71 for sensing the position of the member 70. The position sensor 71 thus outputs an electrical signal related to the sensed superheat, the signal being led out at the top end of the body 60 through a Fusite™ connector 72 which provides the necessary pressure seal. The output signal is supplied to the control circuit 22 on line 34.

The liquid in the phial 68 preferably has a composition which is the same as, or very similar to, that of the refrigerant circulated through the evaporator. If the refrigerant is a mixture of substances having different boiling points, the liquid in the phial 68 should substantially match the least volatile component of the mixture, since that component will determine whether there is any superheat in the refrigerant. In both these cases, the vapour pressure exerted on the longer side of the diaphragm 62 will be that required for measuring the superheat. Alternatively, a known substance, different from the refrigerant, may be used for the phial liquid. In that case, a correction needs to be made to the electrical signal output by the position sensor 71. The correction is to allow for the relationship between the different vapour pressure-temperature characteristics of the liquid in the phial (which determines the vapour pressure in the sub-chamber 69) and the refrigerant in the evaporator (which determines the vapour pressure in the chamber 63).

Alternatively, the superheat sensor 32 may comprise a device for detecting the presence of liquid in the flow of refrigerant at the outlet 24. Such devices are described in UK patent publication numbers 2,302,725 and 2,308,192. The latter is also incorporated herein by reference. One example of such a device will now be described with reference to FIGS. 4a and 4b.

The device comprises principally a tube 80 and a number of components 84 to 86 mounted on the tube, externally thereof. The components consist of a first temperature sensor 85, an electrical heating element 86 mounted adjacent the sensor 85, and a second temperature sensor 84. In this embodiment the two temperature sensors 84, 85 are each temperature-dependent resistors or thermistors, whereas the heating element 86 is an electrical resistor. The thermistor 85 and heating resistor 86 are mounted side-by-side on a first portion or member 83 of the tube wall. The other thermistor 84 is mounted on a second portion or member 82 of the tube wall, diametrically opposing the first portion. The tube 80 is made of a material having a good thermal conductivity, preferably a metal or metal alloy. In this embodiment a copper tube is used.

Figure 4A:
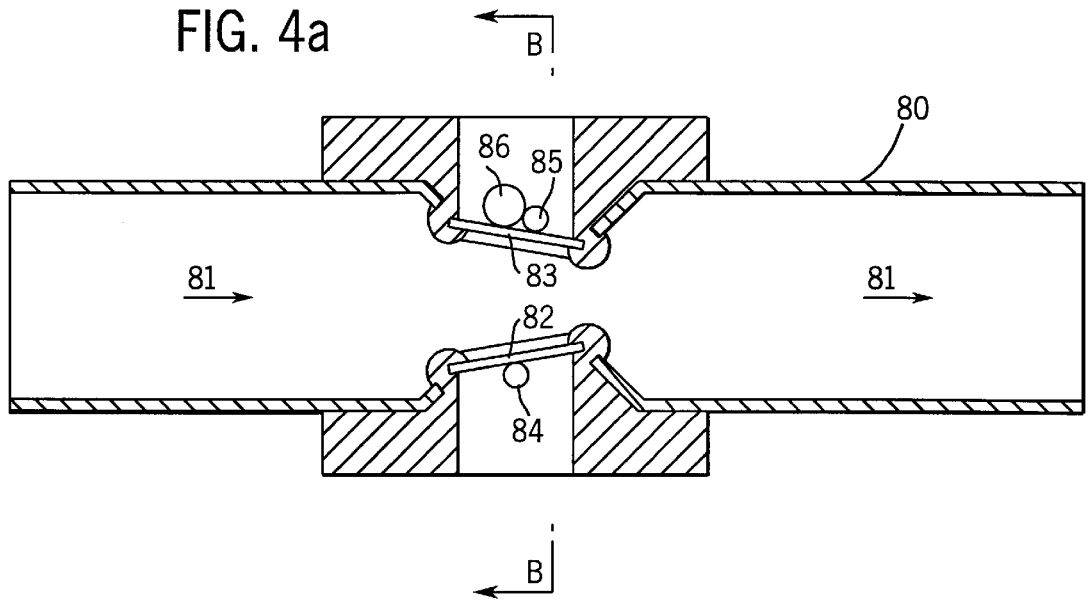
FIGS. 4a and 4b show respectively longitudinal and transverse sections of a liquid-sensing device for use in the embodiment of FIG. 2.
Figure 4B:
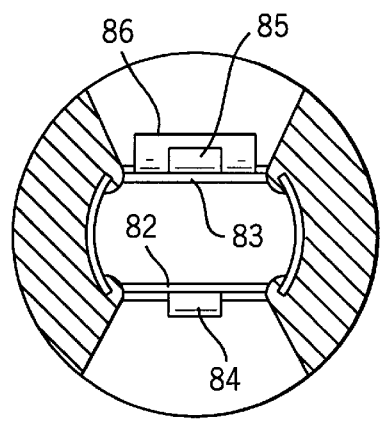

In operation, a fluid which is normally in the gas state flows through the tube 80 in a direction indicated generally by the arrows 81 in FIG. 4a. Both of the thermistors 84, 85 are responsive to the temperature of the fluid flowing past the members 82, 83. In a wholly gaseous fluid, the member 82 will acquire substantially the gas temperature and this temperature is sensed by the thermistor 84. On the other hand, the member 83 will acquire a temperature higher than the gas temperature due to the heating effect of the resistor 86, and this higher temperature is sensed by the thermistor 85.

Thus, when the fluid is completely gaseous and contains no liquid component, there will exist a definite temperature difference between the temperatures sensed by the sensors 84, 85, the difference being determined practically by the magnitude of the current supplied to the heating resistor 86. The difference between the two sensed temperatures is of the order of a few degrees Celsius. In this embodiment, the temperature difference is monitored by a detection means comprising a comparator (not shown). The comparator may be incorporated in the apparatus itself, but it is conveniently provided in the control circuit 22. The detection means is readily implemented using electronic components with which the skilled person is familiar. The outputs of the temperature sensors 84 and 85 may be connected by the line 34 to the control circuit 22.

When liquid appears in the fluid flowing through the tube, the liquid comes into contact with the heated wall portion 83 of a temperature exceeding that of the fluid. The effect of this contact is that the liquid immediately vaporises, the heated portion 83 providing the necessary latent heat for the change of state. The vaporisation of the liquid is manifest by a rapid or sudden lowering of the temperature of the portion 83, which is detected by the thermistor 85. Thus, by monitoring the difference between the temperatures sensed by the thermistors 84 and 85, the occurrence of liquid in the fluid flow can be quickly and reliably established by detecting the corresponding lowering of the temperature difference. For example, the detection may be achieved by setting a threshold for the output of the comparator: if the output level, corresponding to the temperature difference, falls below the threshold (for example, instantaneously or for a predetermined period), an output signal indicating liquid detection is generated.

The size of the temperature difference is dependent on the amount of liquid, i.e. the ratio of liquid to gas in the fluid being monitored. Thus, it is possible to set the threshold for detection at a level which corresponds to a particular degree of wetness which needs to be checked.

The two portions 82, 83 of the tube wall on which the sensing components 84 to 86 are mounted, are substantially thermally isolated from each other.

In FIG. 2, a defrost heater 36 is arranged around the evaporator 8 and can be electrically heated so as to defrost the evaporator 8. The defrost heater 36 is switched on and off under the control of an electrical signal on line 38 from the control circuit 22.

When the control circuit 22 determines that the evaporator 8 should be defrosted, it switches on the defrost heater 36 and closes the expansion valve 18 for the duration of the defrost cycle.

In this example, the electric defrost method is used. Alternatively the air or gas methods, or other known methods of defrosting an evaporator may be used under the control of the control circuit 22.

Figure 5:
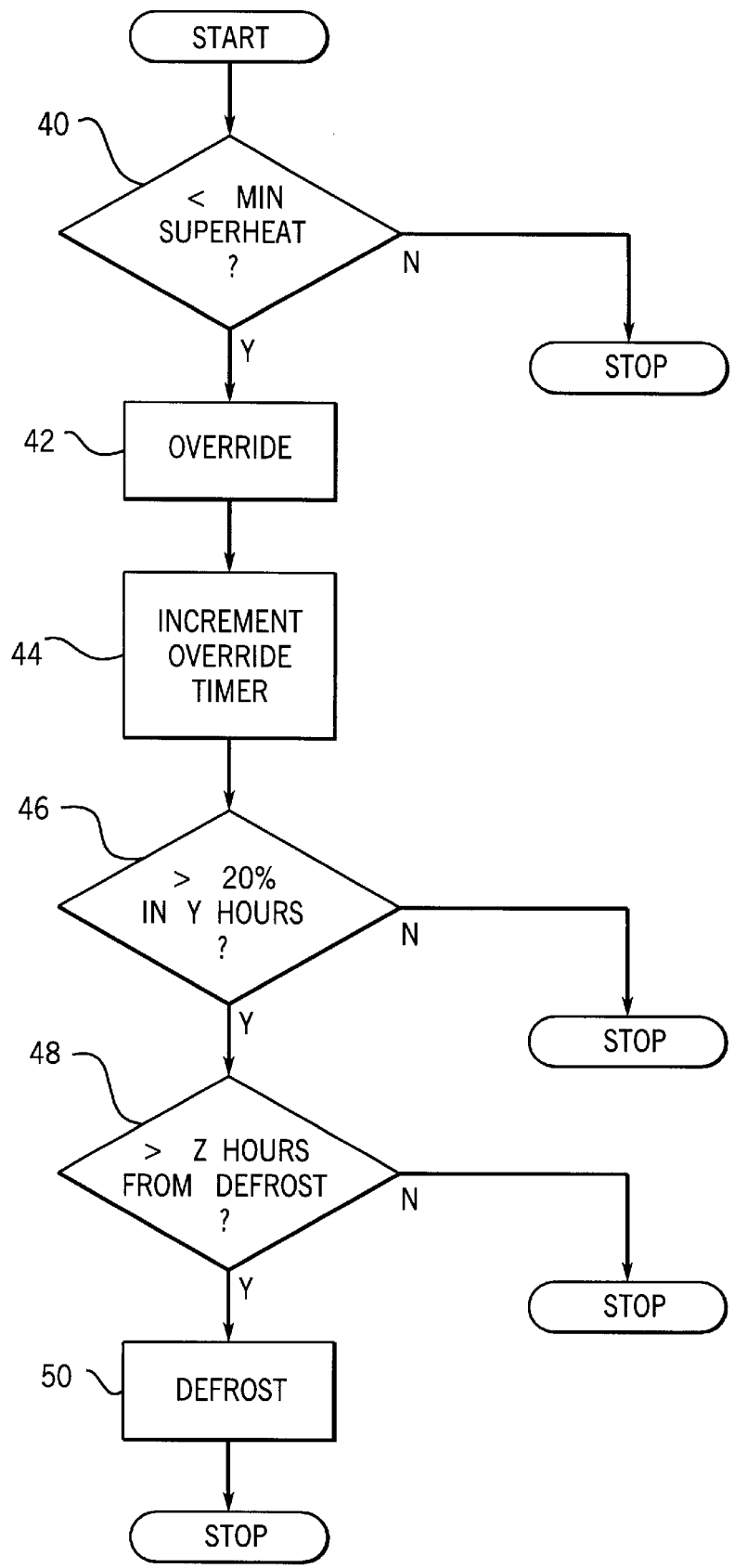
FIG. 5 is a flow chart of a defrost control algorithm performed by the control circuit of FIG. 2.
Figure 6A:
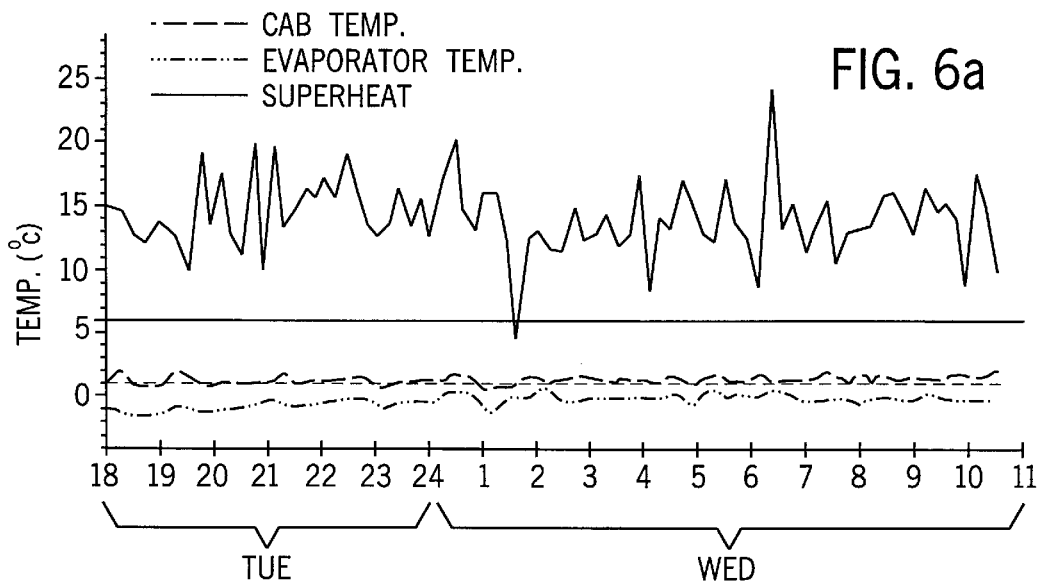
FIGS. 6a to 6i are graphs of the variation with time of cabinet temperature, evaporator temperature and superheat at the outlet of an evaporator of a refrigeration cabinet.
Figure 6B:
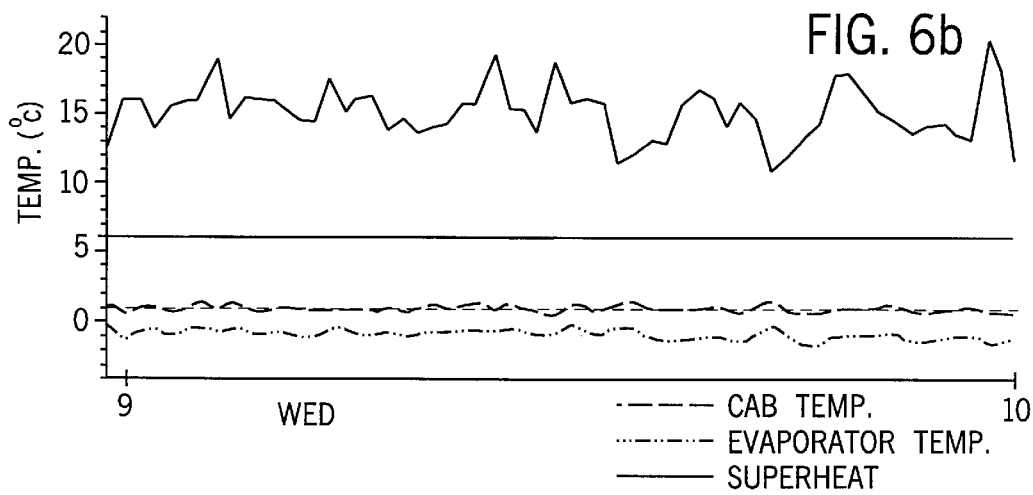
Figure 6C:
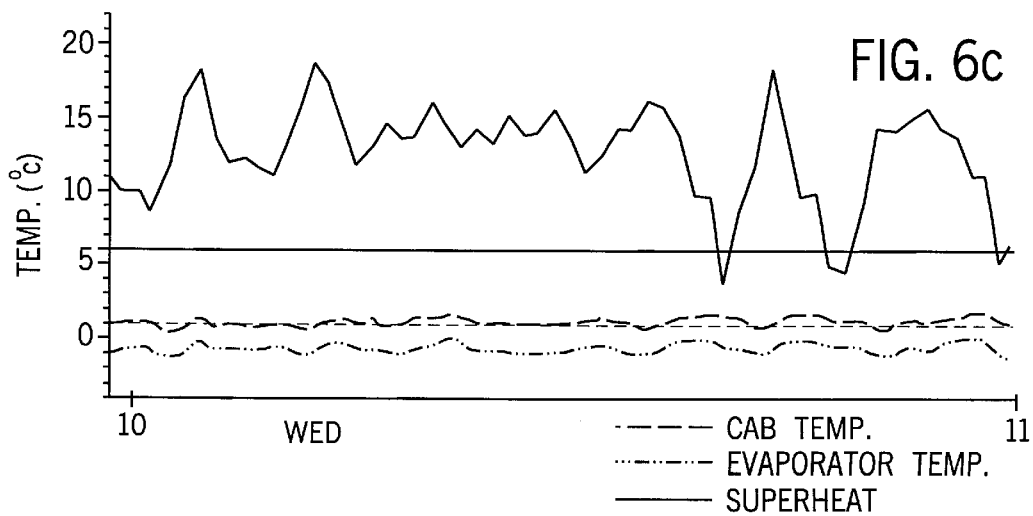
Figure 6D:
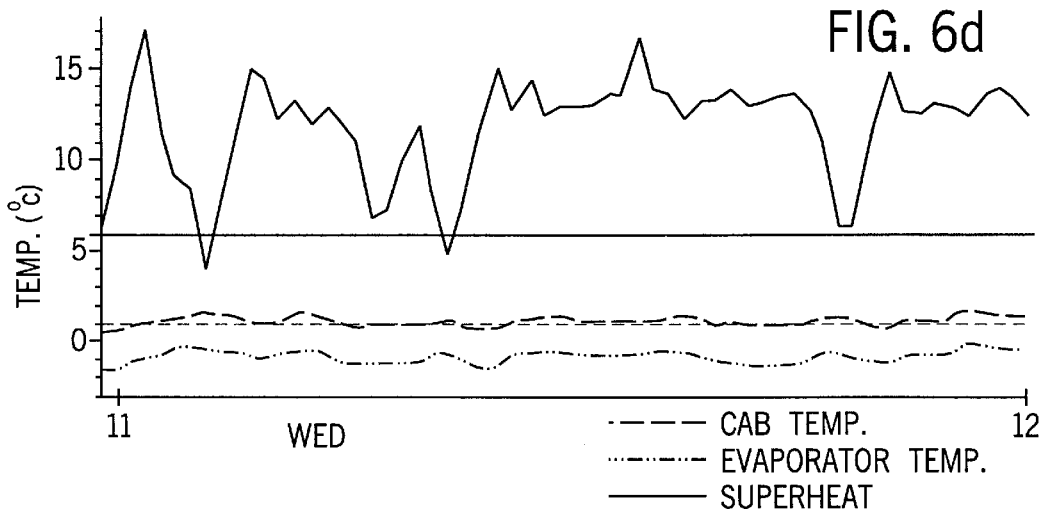
Figure 6E:
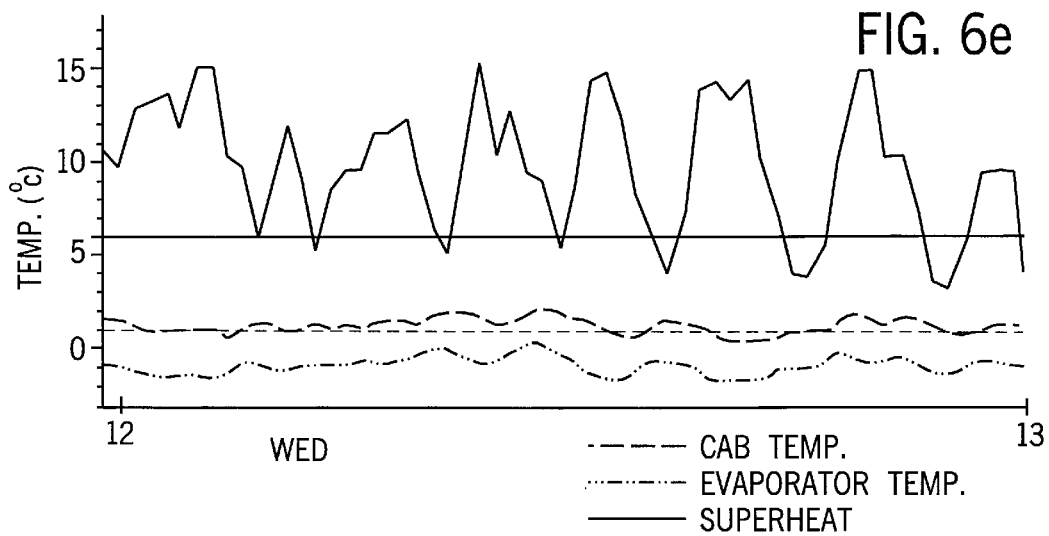
Figure 6F:
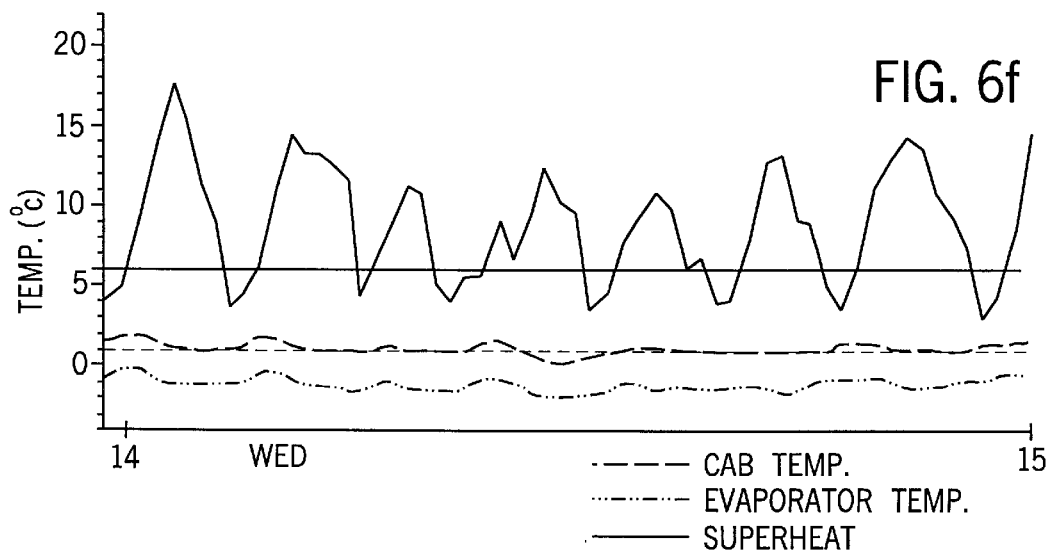
Figure 6G:
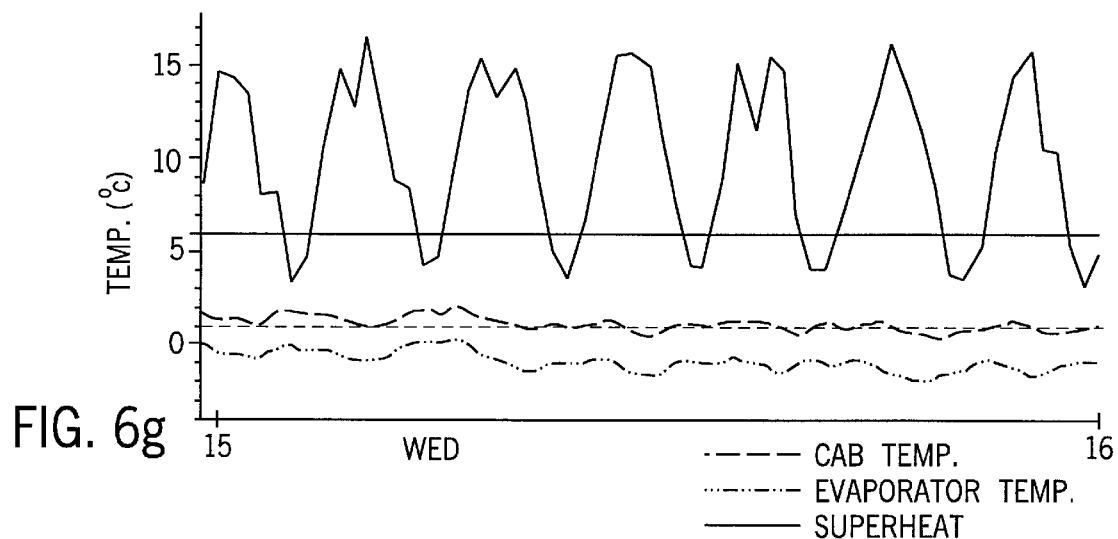
Figure 6H:
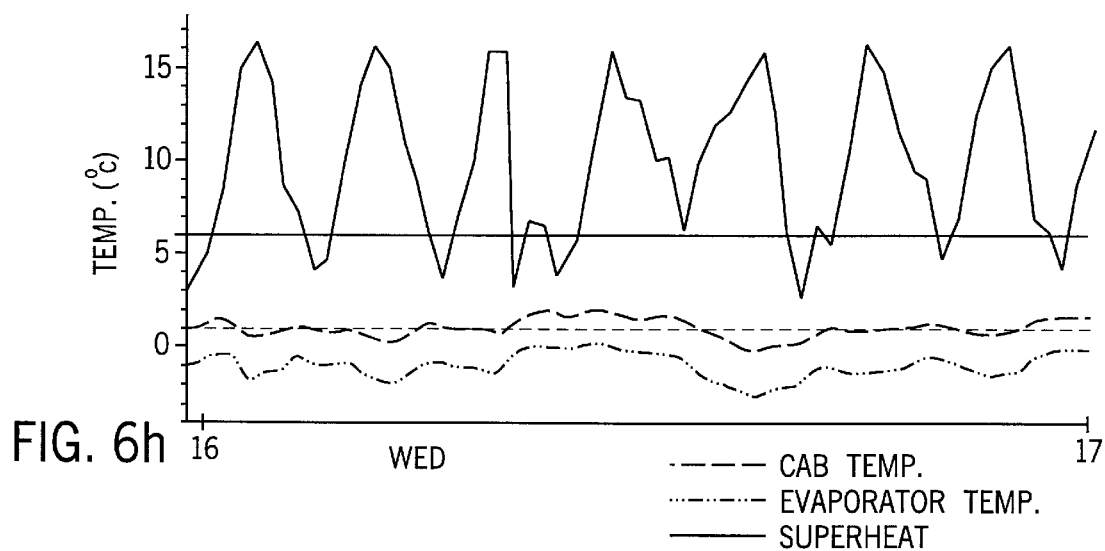
Figure 6I:
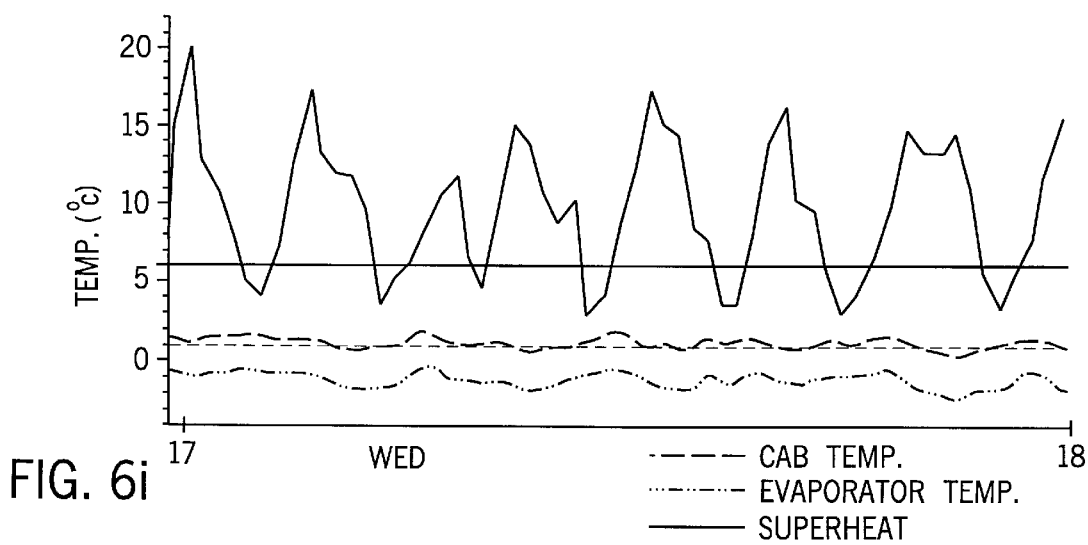

The algorithm executed by the control circuit 22 to initiate defrosting will now be described with reference to the flow chart of FIG. 5. At step 40, the control circuit 22 determines, by means of the superheat sensor 32, whether the refrigerant at the outlet 24 has less than the predetermined minimum level of superheat. If so, the control circuit 22 reduces the open period of the expansion valve 18 by an amount dependent on the level of superheat below the minimum level or the degree of wetness, at step 42.

At step 44 the control circuit 22 records the period of time for which the detected superheat was below the minimum level and stores this value in an internal memory, together with the time at which it occurred. At step 46, the control circuit 22 determines whether the superheat was below the minimum level for more than a percentage x% of the last y minutes. Preferably, x is between 25 and 40%, and y is 30 minutes.

Alternatively, the control circuit 22 may simply record the number of times the superheat fell below the minimum level in the last y minutes, although this method is less preferred since it is less sensitive.

At step 48, the control circuit 22 determines whether more than z hours have elapsed since the last defrost, where z is preferably 6 hours. If so, at step 50, the control circuit 22 initiates defrosting of the evaporator 8. If less than z hours have elapsed since the last defrost, the control circuit 22 ends the algorithm without initiating a defrost.

In one alternative, defrost is automatically initiated if more than a maximum period, such as 2 days, has elapsed since the last defrost, since there is little incremental gain in defrosting at intervals greater than this maximum period.

In one example, in which the refrigerated display cabinet 2 is a stand-alone cabinet, the control circuit 22 begins the defrost cycle immediately.

Alternatively, the defrost cabinet 2 may be one of an array of refrigerated cabinets, such as is used in a supermarket. In that case, there is a maximum number of display cabinets which can be defrosted at any one time, in order to limit the load on the defrosting system. The defrosting of cabinets is therefore coordinated to avoid exceeding this maximum number.

If a gas defrost method is used, the hot or cool gas may be distributed from a central plant room to the evaporators of the cabinets to be defrosted. The control circuit 22 is connected through a communications network to a defrost controller located in the plant room. The defrost controller controls the opening and closing of valves to direct the hot or cool gas to the evaporators selected for defrosting.

At step 50 the control circuit 22 sends a signal to the remote defrost controller, which adds data representing the refrigerated cabinet 2 to a defrost queue. The remote defrost controller defrosts the cabinets in the order of the queue.

In such a system, a delay is incurred between entering the cabinet on the defrost queue, at step 50, and defrosting of the evaporator 8. However, the frequency of "overrides", at which the superheat falls below the minimum level or to zero, begins to increase a considerable time before the defrost becomes essential. Therefore, the values of x and y can be set so that, even allowing for the queuing delay, defrosting takes place before the evaporator 8 frosts up completely.

Alternatively, the hot or cool gas can be supplied through a ring main, separately from the normal supply of refrigerant. When the control circuit 22 initiates defrost, it opens a valve to connect the evaporator 8 to the ring main. The control circuit 22 of each display cabinet may be connected to a communications network so as to coordinate defrosting to avoid exceeding the maximum number of cabinets which are defrosted at any one time. In this case, the control circuit may initiate defrosting by sending a defrost request signal over the network and open the valve in response to a defrost control signal from the network.

Figure 3:
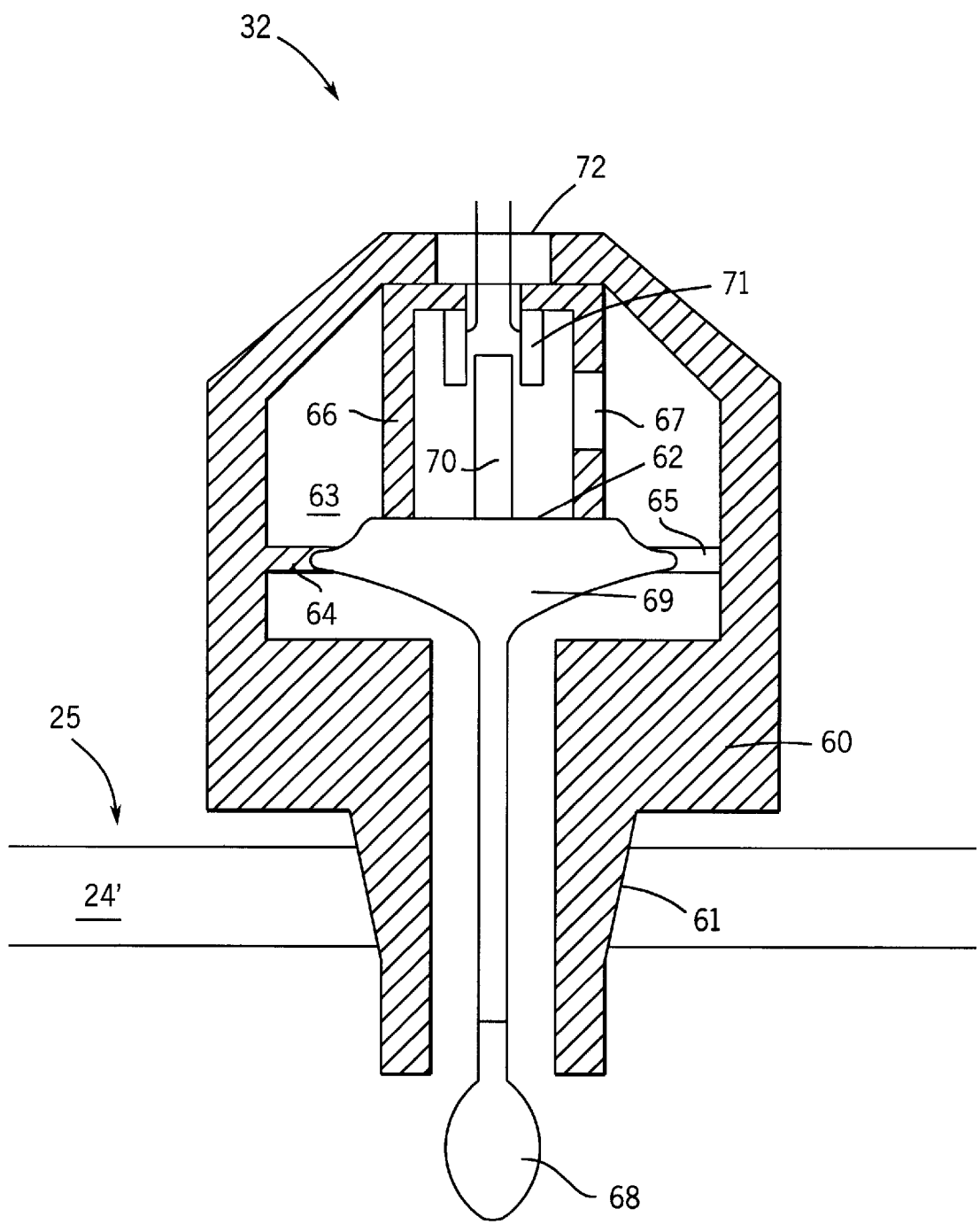
FIG. 3 shows a cross-section of a superheat sensor for use in the embodiment of FIG. 2.

A practical example of the operation of the defrost algorithm shown in FIG. 3 will now be described with reference to the graphs shown in FIGS. 6a to 6i and Table 1 below.

In this example, the evaporator 8 was last defrosted at 15.00 hours on Tuesday. The graphs show the degree of superheat, the cabinet temperature $T_3$ and the evaporator temperature $T_E$ as a function of time. The minimum superheat level is set at 6° C. and the desired cabinet temperature $T_3$ at 1° C.

Table 1 below records the time at which overrides occur, the approximate length in minutes of these overrides, and the total period of overrides in the last thirty minutes. Graph 6a covers the period from 18.00 hours on Tuesday to 11.00 on Wednesday, while graphs 6b to 6i each cover one hour of a sequence from 09.00 hours to 18.00 hours on Wednesday, excluding from 13.00 to 14.00 hours, for which no data was available. The last two hours of graph 6a are covered by graphs 6b and 6c.

TABLE 1

| Graph (Period covered) | Approx Override Length (mins) | Time | Max Total Override Time (last 30 minutes) |
|---|---|---|---|
| 6a | 1 | 2320 | 1 |
| 18:00– | 1 | 0145 | 1 |
| 11:00 | 1 | 0625 | 1 |
|  | 1 | 0750 | 1 |
| 6b | — | — | — |
| 09.00– |  |  |  |
| 10.00 |  |  |  |
| 6c | 1 | 1040 | 1 |
| 10.00– | 3 | 1045 | 4 |
| 11.00 | 2 | 1055 | 6 |
| 6d | 2 | 1110 | 7 |
| 11.00– | 2 | 1120 | 6 |
| 12.00 | 2 | 1150 | 2 |
| 6e | 1 | 1210 | 3 |
| 12.00– | 1 | 1215 | 4 |
| 13.00 | 2 | 1225 | 4 |
|  | 1 | 1230 | 5 |
|  | 2 | 1235 | 6 |
|  | 4 | 1245 | 9* |
|  | 4 | 1253 | 13 |
|  |  |  | *(defrost triggered) |
| 13.00– | No data |  |  |
| 14.00 |  |  |  |
| 6f | 3 | 1400 | — |
| 14.00– | 3 | 1410 | — |
| 14.00– | 1 | 1415 | — |
| 15.00 | 5 | 1420 | — |
|  | 3 | 1430 | 12 |
|  | 3 | 1440 | 12 |
|  | 3 | 1440 | 9 |
|  | 3 | 1455 | 12 |
| 6g | 2 | 1505 | 11 |
| 15.00– | 1 | 1513 | 7 |
| 16.00 | 2 | 1521 | 8 |
|  | 2 | 1530 | 7 |
|  | 2 | 1537 | 7 |
|  | 2 | 1545 | 8 |
|  | 2 | 1558 | 8 |
| 6h | 2 | 1607 | 8 |
| 16.00– | 1 | 1615 | 7 |
| 17.00 | 1 | 1620 | 6 |
|  | 2 | 1622 | 8 |
|  | 3 | 1635 | 9 |
|  | 1 | 1645 | 8 |
|  | 1 | 1655 | 5 |
| 6i | 2 | 1705 | 7 |
| 17.00– | 2 | 1712 | 6 |
| 18.00 | 1 | 1718 | 6 |
|  | 2 | 1725 | 8 |
|  | 2 | 1735 | 9 |
|  | 3 | 1742 | 10 |
|  | 2 | 1750 | 9 |

Until approximately 10.45 on Wednesday, only occasional overrides occur. Some of these overrides are of sufficiently short duration that they are not recorded on the graphs.

At 12.45, the control circuit 22 has been in the override state for 9 minutes, which is greater than 25%, of the last 30 minutes. More than 6 hours have elapsed since the last defrost, at 15.00 hours on Tuesday. Therefore, the control circuit 22 reaches step 50 and triggers a defrost by entering the evaporator 8 on the defrost queue. After the defrost has been triggered at step 50, but before defrosting occurs, overrides occur at more or less regular intervals but the cabinet temperature $T_3$ does not vary significantly from the ideal temperature of 1° C.

At 18.30, after the time period shown in graph 6i, the evaporator 8 is defrosted. To reduce the temperature shock and energy consumption caused by a defrost cycle, the defrost cycle should stop as soon as possible after all the ice on the evaporator 8 has melted. The temperature $T_E$ in the vicinity of the evaporator 8 is measured and the defrost cycle is stopped when the temperature rises above a predetermined level, such as 15° C. If the temperature has not risen above this level after a predetermined period, then the defrost cycle is stopped.

Alternatively, the evaporator 8 may be isolated from the rest of the system and the pressure within the evaporator is measured. Provided the evaporator contains a mixture of liquid and gaseous refrigerant, the vapour pressure inside the evaporator 8 is used to determine the temperature of the evaporator. When this temperature has risen above a predetermined level, the defrost cycle is stopped. Alternatively, the defrost period is determined by a timer set so as to ensure that all the frost has melted, without causing too great a temperature shock.

Since the defrost cycle is only activated for a short time, the temperature of the cabinet contents does not rise sufficiently to cause spoiling of perishable goods.

Although the above embodiment has been described with reference to a refrigerated display cabinet, it will be appreciated that the present invention is also applicable to any heat transfer system in which frequent defrosting of an evaporator 8 is required. For example, the present invention is also applicable to freezer display cabinets, blast chillers, blast freezers, air conditioners or heat pumps in which heat is extracted from ambient air or water in a heating system.

In the embodiments described above, two different methods are described for detecting whether the superheat of refrigerant leaving the evaporator is at or below a predetermined level. Other methods may be used without departing from the scope of the invention. For example, the outlet pressure and temperature may be detected and may be used to calculate the degree of superheat, or a lookup table may be used to determine which values of pressure and temperature correspond to a degree of superheat below the predetermined level. Other methods of detecting the presence of liquid in the refrigerant may be used, such as described in the document GB-A-2 157 447, for example.

What is claimed is:

1. Apparatus for controlling defrosting of an evaporator in a heat transfer system, comprising:

a superheat detector for detecting whether the superheat of refrigerant at an outlet of the evaporator is at or below a predetermined level, a temperature detector for detecting whether the temperature of a thermal load cooled by the evaporator is above a maximum level and defrost control means responsive to said superheat detector and said temperature detector to initiate defrosting of the evaporator in response to the temperature of the thermal load being above said maximum level and the superheat of the refrigerant being at or below said predetermined level.

2. Apparatus as claimed in claim 1, wherein the superheat detector comprises a superheat sensor for detecting the degree of superheat of the refrigerant.

3. Apparatus as claimed in claim 1, wherein the superheat detector comprises a liquid sensor for detecting the presence of liquid at the outlet.

4. Apparatus as claimed in claim 1, further comprising valve control means for controlling an expansion valve which regulates the flow of refrigerant through the evaporator, in response to said temperature detector, so as to maintain the temperature of the thermal load below said maximum level.

5. Apparatus as claimed in claim 4, wherein the valve control means is additionally responsive to said superheat detector to enter an override condition when the superheat of the refrigerant is at or below said predetermined level, the valve control means being operable in said override condition to reduce the flow of refrigerant through the evaporator and to override the regulation of refrigerant flow in response to said temperature detector.

6. Apparatus as claimed in claim 5, wherein the defrost control means is operable to initiate defrosting in response to the occurrence of said override condition.

7. Apparatus as claimed in claim 6, wherein the defrost control means is operable to calculate the proportion of a predetermined period in which the valve control means is in said override condition and to initiate defrosting when said proportion exceeds a predetermined level.

8. Apparatus as claimed in claim 7, including a timer for determining the time elapsed since defrosting of the evaporator, the defrost control means being operable to initiate further defrosting of the evaporator only when said elapsed time exceeds a predetermined minimum time.

9. Apparatus as claimed in claim 1, including defrosting means operable to defrost the evaporator in response to initiation of defrosting by the defrost control means.

10. Apparatus as claimed in claim 1, wherein said evaporator is arranged to extract heat from a display cabinet.

11. A display cabinet including apparatus as claimed in claim 10.

12. Apparatus as claimed in claim 6, wherein the defrost control means is operable to initiate defrosting in response to the occurrence of said override condition exceeding a predetermined level.

13. A method of controlling defrosting of an evaporator in a heat transfer system, comprising:

detecting whether the superheat of refrigerant leaving the evaporator is at or below a predetermined level;

sensing the temperature of a thermal load cooled by the evaporator;

regulating the flow of refrigerant through the evaporator so as to maintain said temperature below a predetermined maximum temperature;

overriding said regulating step so as to reduce the flow of refrigerant in response to said positive determination at said detecting step; and initiating defrosting of the evaporator in response to the occurrence of said overriding step.

14. A method as claimed in claim 13, further comprising:

determining the occurrence of said overriding step;

the step of initiating defrosting being performed when said occurrence exceeds a predetermined level.

* * * * *